United States Patent
Boesch

(10) Patent No.: US 6,422,460 B1
(45) Date of Patent: Jul. 23, 2002

(54) AUTHORIZATION SYSTEM USING AN AUTHORIZING DEVICE

(75) Inventor: Brian Boesch, Oak Hill, VA (US)

(73) Assignee: VeriSign, Inc., Mountain View, CA (US)

(*) Notice: Subject to any disclaimer, the term of this patent is extended or adjusted under 35 U.S.C. 154(b) by 0 days.

(21) Appl. No.: 09/240,417

(22) Filed: Jan. 29, 1999

(51) Int. Cl.$^7$ .................................................. G06K 5/00
(52) U.S. Cl. ..................................... 235/380; 235/375
(58) Field of Search ............................... 235/375, 380, 235/382, 382.5, 492, 486

(56) References Cited

U.S. PATENT DOCUMENTS

| | | | |
|---|---|---|---|
| 4,511,970 A | 4/1985 | Okano et al. ............... | 364/401 |
| 4,587,629 A | 5/1986 | Dill et al. ................... | 364/900 |
| 4,650,980 A | 3/1987 | Mizutani .................... | 235/380 |
| 4,959,788 A | 9/1990 | Nagata et al. .............. | 364/408 |
| 4,968,873 A | 11/1990 | Dethloff et al. ............. | 235/380 |
| 5,006,698 A | 4/1991 | Barakat ....................... | 235/382 |
| 5,239,664 A | 8/1993 | Verrier et al. ............... | 395/800 |
| 5,386,104 A | 1/1995 | Sime ........................... | 235/379 |
| 5,434,397 A | 7/1995 | Diehl et al. ................. | 235/380 |
| 5,594,227 A | 1/1997 | Deo ............................ | 235/380 |
| 5,613,001 A | 3/1997 | Bakhoum ..................... | 380/4 |
| 5,621,201 A | * 4/1997 | Langhans et al. ........... | 235/380 |

* cited by examiner

Primary Examiner—Karl D. Frech
(74) Attorney, Agent, or Firm—Roberts, Abokhair & Mardula, LLC

(57) ABSTRACT

An authorization system using authorizing devices, such as smart cards. The authorizing devices of the present invention are used to authorize transactions on a computer system. The present invention is used to provide security against authorizing multiple transactions that are in a queue, the present invention comprises an authorizing device that only allows the authorization of only one transaction at a time. The authorization of only one transaction is accomplished by software which set an indicator in the volatile memory of the processing module on the authorizing device. The indicator indicates whether a transaction has been authorized or not. If the indicator indicates that one transaction has been authorized, then no further transactions can be authorized. A processing module in the authorizing device operates software which instructs the processing module to set an indicator once a transaction has been authorized. In the preferred embodiment, the indicator is an authorization bit in the volatile memory of the authorizing device. The setting of the authorization bit indicates that one signature has been made. If the authorization bit is set, no other signatures can be made during that session. Therefore if the authorizing party attempts to authorize more than one fraudulent transaction, the fraud is limited to only that transaction and no others. In order to use the authorizing device again, the authorization bit needs to be reset. The authorization bit can be reset by the use of a switch on the authorizing device.

70 Claims, 2 Drawing Sheets

AUTHORIZATION SYSTEM USING AN AUTHORIZING DEVICE

FIELD OF THE INVENTION

The present invention relates to a secure authorization system using an authorizing device. More particularly, the present invention relates to a software implementation which limits unauthorized use of an authorizing device, such as a smart card.

BACKGROUND

As computer technology advances, more people are using their computers for everyday tasks. Bank customers are able to check their account balances, transfer money, and pay bills using a computer. The frequency of purchasing products over the Internet is also increasing. To permit this electronic commerce, consumers are paying for the purchased items using various forms of electronic means, such as credit cards, CyberCoin®, and other electronic means. Unfortunately, as the demand for more on-line purchasing options rises so does the need to combat fraud and hence the need for security measures.

Security measures, such as external authorizing devices, i.e., palmtops or personal digital assistants (PDAs), computers, laptop computers, smart cards, etc. are becoming more popular as a means to authorize a transaction. The most popular external device is the smart card. Smart cards are similar to credit cards but include software, a processing module, and a limited amount of memory. The software controls the processing module.

The software and processing module allow a user to use a smart card to authorize a transaction. The authorization can be for approving transactions such as purchases, business expenses, paying business expenses, training, and many other business related items, however this list should not be construed as a limitation. To authorize a transaction, the transaction is submitted to a queue for authorization. The authorizing authority uses the smart card to authorize the transaction in the queue. The software and processing module on the smart card provide the authorizing signature. Authorization can take several forms, but typically the authorizing party enters a password and clicks on an icon which authorizes the transaction. The authorized transaction is then routed back to the user who submitted the transaction to the authorization queue. In some systems, a signature or an icon will indicate that the transaction has been authorized.

Although authorizing devices are an effective security measure, they are not fool proof. For example, present day smart cards are subject to authorizing unauthorized transactions, i.e., fraud. This problem occurs when a person is using a computer network and a transaction is submitted to the authorizing party's computer for the authorizing party's authorization. Unknown to the authorizing party, when the party authorizes what he or she believes is only a single transaction, that party is actually authorizing multiple transactions. As a result, the authorizing party unknowingly authorizes additional transactions which are typically not discovered until a much later date.

This problem has become so notorious, that the problem is known as the Radar O'Reilly attack. The name is based on the popular television show MASH, where the company clerk, Radar O'Reilly hands his Colonel papers to be signed and the Colonel authorizes the paperwork without looking at the paperwork.

Security for smart cards have been the subject of numerous inventions. U.S. Pat. No. 5,594,227 to Deo was granted for a "System and Method for Protecting Unauthorized Access to Data Contents." The Doe invention recognizes the problem of protecting smart cards against unauthorized use by either human or electronic-machine intervention. This invention is concerned with deterring unauthorized access to a user's smart card by preventing someone from trying to guess the true user's password.

U.S. Pat. No. 4,650,980 to Mizutani was granted for "Individual Discrimination Cards." The Mizutani invention memorizes the frequency of erroneously entered secret codes. Memorization is accomplished by changing the value of a bit. If the number of erroneously entered secret codes reaches a set value, the card is ejected from the machine.

U.S. Pat. No. 5,434,397 to Diehl et al. was granted for "Protection Against the Non-Authorized Inhibition of Writing in Certain Storage Areas of a Smart Card." This invention sends data to a smart card and checks to see if the data is written to a proper location. If the data is not written to the proper location, certain functions of the card may be blocked. If the data is not written to the proper location, a bit could be changed to indicate a problem.

These inventions address unauthorized access to the smart card. They do not address preventing unknowing authorization of multiple transactions. Deo and Mizutani are concerned with preventing someone from trying to guess the password of a smart card. Diehl is concerned with blocking access to certain functions of a smart card. Therefore there is a need to prevent the unauthorized authorization of multiple transactions which are presented to a user using a smart card or an authorizing device to authorize a transaction.

SUMMARY OF THE INVENTION

It is an object of the present invention to limit the authorization of unauthorized transactions which are authorized using an authorizing device.

A further object of the present invention is to authorize only one transaction at a time when using an authorizing device to authorize transactions.

A further object of the present invention is to save information relating to the authorization of a transaction.

The present invention is an authorization system for!authorizing one transaction at a time using an authorizing device. The authorizing devices can include palmtops or personal digital assistants (PDAs), computers, laptop computers, smart cards, or similar authorizing devices having a processing module. The processing module of the authorizing device is used to provide the user of the authorizing device the ability to make decisions. The decision making ability can be used to provide an authorizing signature. However, authorizing devices are subject to attack when a program presents additional transactions to the authorizing device for an authorizing signature in a single session. The present invention is an authorization system that limits the number of transactions that can be authorized at one time. The authorizing device of the present invention is used to authorize transactions on a computer network system or over the Internet. The authorization can be for approving transactions such as purchases, business expenses, paying business expenses, training, and many other business related items, however this list should not be construed as a limitation.

To provide security against authorizing multiple transactions that are in a queue, the present invention comprises an authorizing device that only allows the authorization of only one transaction at a time. The authorization of only one transaction is accomplished by software which sets an indicator in the memory of the processing module on the authorizing device. In the preferred embodiment, the indicator referred to as the authorization bit. The setting of the indicator indicates that the authorizing device has already authorized one transaction. If the indicator is set, no other signatures can be made during that session. Therefore if an unauthorized third party attempts to authorize more than one fraudulent transaction, the fraud is limited to only that transaction and no others. In order to use the authorizing device again, the indicator needs to be reset.

In the preferred embodiment, the memory of the processing module on the authorizing device includes volatile memory with the indicator being stored in the volatile memory. When power is disconnected to the authorizing device, the indicator is reset. In order to reset the indicator in a smart card system, the power to the smart card is disconnected by removing the smart card from the smart card reader. Upon removal from the smart card reader, power to the smart card is disconnected which in turn resets the indicator.

In alternate embodiments, the indicator is reset by the use of a mechanical switch on the authorizing device. For smart cards, the mechanical switch can be on either the smart card or the smart card reader. In yet another embodiment, the indicator is reset by sending a reset signal to the indicator by a transmitter, such as an infrared or radio frequency (RF) transmitter.

In the preferred embodiment, information relating to a transaction is saved. This information can be used to determine how the fraudulent authorization occurred. Software, which can be located on either the computer system (referred to as "system software") or on the authorizing device (referred to as "authorization software"), provides instructions to store information relating to a transaction. The information relating to a transaction is stored in nonvolatile memory. The memory can be memory on the computer system (referred to as "system memory") or in memory on the authorizing device (referred to as "authorizing device memory").

The amount of transaction information that is stored can vary as well. For example, in one embodiment, only the pertinent information such as who originated the transaction, when the transaction was authorized, and where the authorized transaction was sent is stored. The number of transactions that are stored can vary as well. For example, in one embodiment, only information relating to the last transaction is stored.

Using the system software, the authorizing party can access the stored information at a later time. Allowing access to the stored information can help to determine if a fraudulent authorization occurred. This information can then be used to discover who was responsible for submitting the fraudulent transaction and can eventually be held liable for his or her actions.

DETAILED DESCRIPTION OF THE INVENTION

Figure 1:
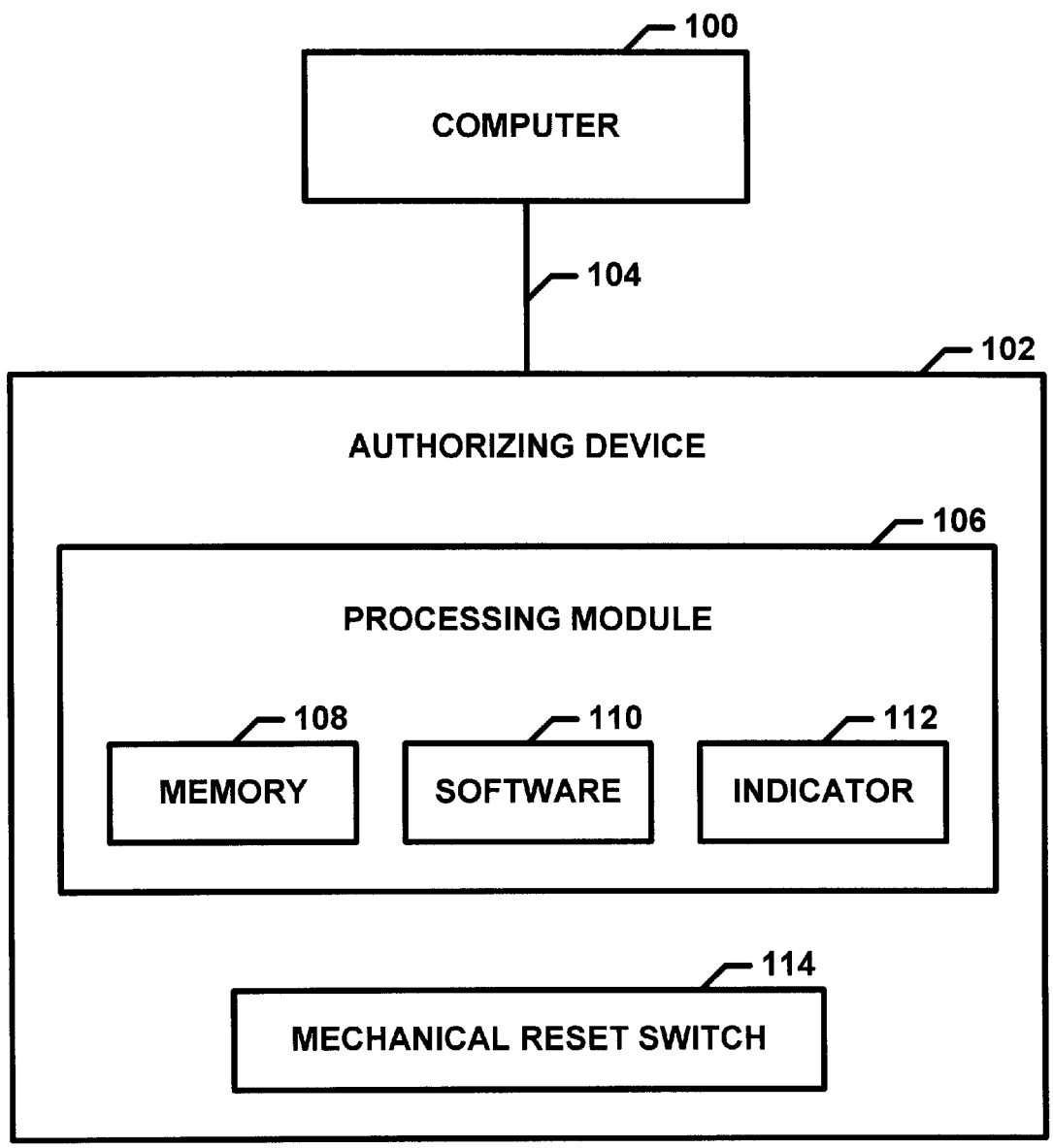
FIG. 1 illustrates the process of authorizing a transaction using an authorizing device.

Referring to FIG. 1, the authorization system of the present invention is illustrated. The present invention is for an authorization system for authorizing one transaction at a time. The authorization system includes computer 100, authorizing device 102 and connector 104. In the preferred embodiment, authorizing device 102 is an external authorizing device which uses connector 104 to connect computer 100 and authorizing device 102. Connector 104 allows computer 100 and authorizing device 102 to communicate. In the preferred embodiment, connector 104 is a wire. In an alternate embodiment, connector 104 is a wireless connection, such as an infrared system or an RF system.

In one embodiment, computer 100 is connected to a network computer system, where computer 100 is used to authorize transactions. The authorized transactions can include transactions such as purchases, business expenses, paying business expenses, training, and many other business related items however this list should not be construed as a limitation. In an alternate embodiment, computer 100 is used to authorize transactions over the Internet.

Authorizing device 102 is a device which includes a processing module which allows a user to authorize a transaction. Authorizing device 102 can be a palmtop or personal digital assistant (PDA), computer, laptop computer, smart card system, or an authorizing devices having a processing module. In the preferred embodiment, authorizing device 102 is a smart card system which comprises a smart card and a smart card reader. The smart card reader can be incorporated into computer 100 or can be a stand alone item which communicates with computer 100.

Authorizing device 102 comprises authorizing device processing module 106, which further comprises authorizing device memory 108, authorization software 110, and indicator 112. Indicator 112 indicates whether the maximum number of transaction have been authorized. In the preferred embodiment, indicator 112 is set if one transaction has been authorized. In alternate embodiments, the indicator can be programmed to permit a larger number of authorizations. In the preferred embodiment, the indicator is at least one bit which is defined for the purpose of this application as the "authorization bit." If indicator 112 indicates that indicator 112 is set, then authorizing device 102 can not be used to authorize another transaction until indicator 112 is reset.

Resetting indicator 112 can occur in a variety of ways. In one embodiment, mechanical reset switch 114 is used to reset indicator 112. Mechanical reset switch 114 allows a user to mechanically reset indicator 112. By depressing mechanical reset switch 114, a reset command is sent to authorizing device processing module 106 which resets indicator 112. In the preferred embodiment, the reset command is sent via a wire which connects mechanical reset switch 114 and authorizing device processing module 106. In alternate embodiments, the wire is replaced by a wireless link, where the reset command is transmitted to the to authorizing device processing module 106. The wireless link can be an infrared link or an RF link.

In another embodiment, a mechanical reset switch is located on either the smart card or the smart card reader. Again, by depressing the mechanical reset switch, indicator 112 is reset. If the mechanical reset switch is located on the smart card, the mechanical reset switch can be positioned to allow a user to reset indicator 112 without having to remove the smart card from the smart card reader. If the mechanical reset switch is located on the smart card reader, the user does not have to remove the smart card in order to reset indicator 112.

Electronic reset switches can be used in place of the mechanical switches. However, electronic switches are susceptible to an unauthorized party or a virus resetting the indicator. Requiring a physical action to reset the indicator ensures against improper resetting of the indicator. Any type of resetting system which uses software to reset the switch is susceptible to improper resetting of the indicator.

In the preferred embodiment, authorizing device memory 112 includes volatile and non-volatile memory. In the preferred embodiment, indicator 112 is located in the volatile memory. In order to reset indicator 112, power to the authorizing device is disconnected which clears the volatile memory, thereby resetting indicator 112. For smart cards, resetting indicator 112 is accomplished by removing the smart card from the smart card reader. When the smart card is removed, power to the smart card processing module is disconnected thereby resetting indicator 112. By inserting the smart card into a smart card reader, connected to a computer, the authorizing party is able to authorize another transaction. In the preferred embodiment, information relating to a transaction (referred to as "transaction information") is stored in the non-volatile memory.

Authorization software 110 determines whether indicator 112 has been set or not, i.e., whether the maximum number of transactions have been authorized or not. Authorization software 110 also instructs authorizing device processing module 106 to set indicator 112 when an authorizing party has authorized the maximum number of transactions. In the preferred embodiment, the maximum number of transactions that can be authorized is one transaction. In addition, authorization software 110 instructs authorizing device processing module 106 to save transaction information in memory. Typically, the transaction information is saved to non-volatile memory.

Figure 2:
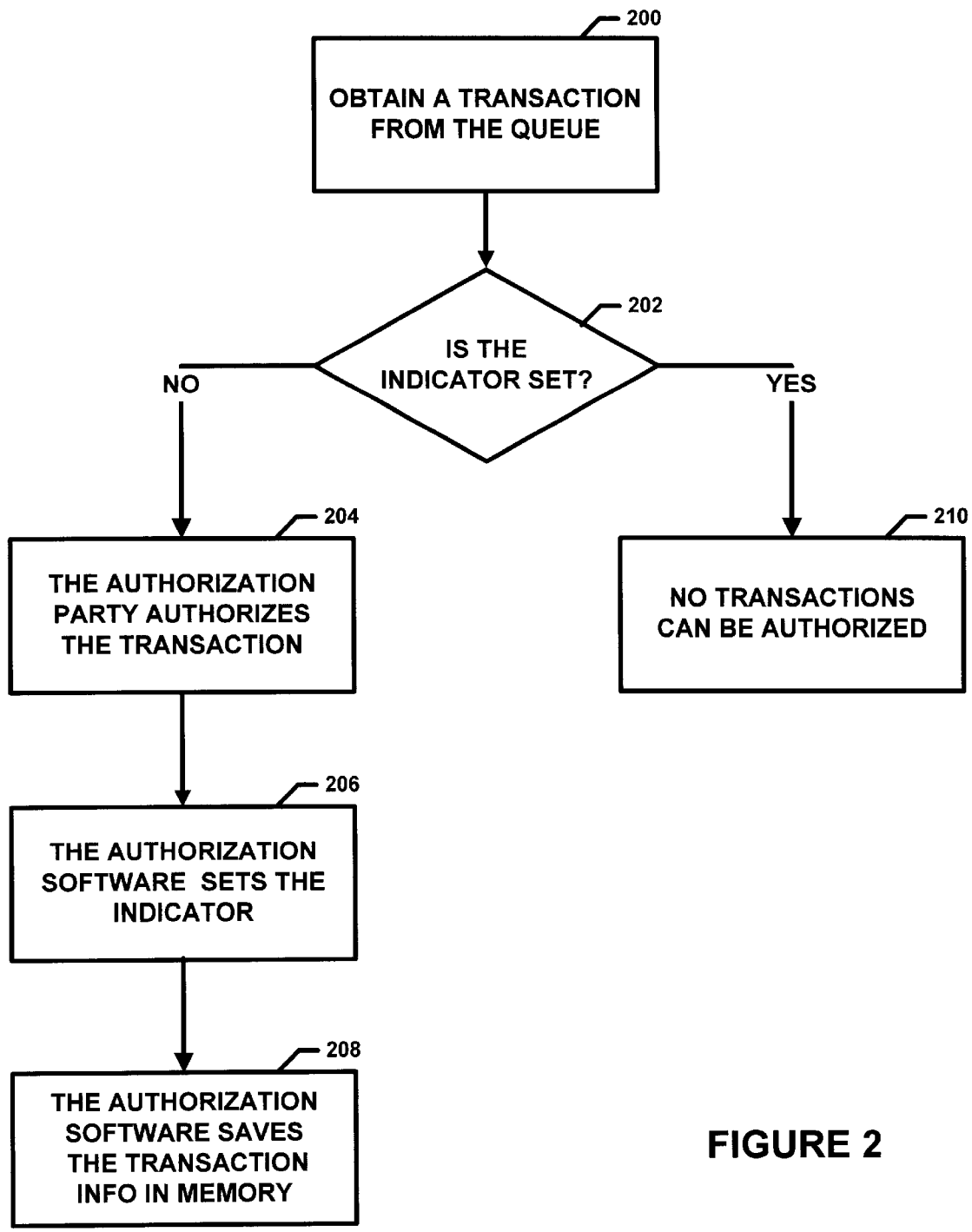
FIG. 2 illustrates an authorization device.

Referring to FIG. 2, the authorization of a single transaction using the present invention is illustrated. The process begins when the computer and authorizing device are connected and the authorizing device obtains a transaction, to be authorized, from the queue 200. In the preferred embodiment, the user inserts a smart card of the present invention into a smart card reader connected to a system processing module.

The authorization software instructs the authorizing device processing module to check the status of the indicator 202. If the status of the indicator indicates that the indicator is set, then no further authorizations are possible until the indicator is reset 210. If the status of the indicator indicates that the indicator is not set, i.e., no transactions have been authorized, then a single transaction can be authorized using the authorizing device. The authorizing party authorizes a single transaction using means known in the art 204. The authorization software then instructs the authorizing device processing module to set the indicator 206. The authorization software then saves information relating to the transaction (referred to as "transaction information) in memory 208. Saving transaction information is discussed in further detail below.

In an alternate embodiment, the indicator can be programmed so as to permit a number of transactions greater than one. The number of transactions greater than one will increase the risk of fraud (that is, of authorizing an unauthorized transaction), however the risk may be deemed acceptable in some circumstances. In such an embodiment, the indicator indicates if the maximum number of transactions have been authorized. If the indicator is not set, then the authorizing party can authorize a transaction. If the indicator is set, then no further transactions can be authorized until the indicator is reset.

As mentioned above, the authorization software instructs the authorizing device to save transaction information in memory. In one embodiment, the system software instructs the system processing module to store the transaction information in memory. In another embodiment, the system software instructs the authorizing device processing module to store the transaction information in memory. The transaction information can be stored in the memory of the computer, the memory of the network system in which the computer is connected to, or in the memory of the authorizing device. In the preferred embodiment, the transaction information is saved in non-volatile memory.

Regardless of where the information relating to a transaction is stored, the stored information can take several forms. For example, in one embodiment, the top half of the first page of the transaction can be saved. Typically the top half of the first page includes the necessary information to help establish when the transaction was authorized, as well as who and where the transaction was originated. In another embodiment, only key aspects of the transactions are saved. The following lists includes key aspects: names, dates, order numbers or other information that is key to the transaction, however this list should not be construed as a limitation.

In addition, the number of transactions for which the transaction information is being stored for can vary as well. For example, in one embodiment, information relating to only the last transaction can be stored. The number of transactions for which information can be stored, can range from storing the most recent transaction to alternatively storing all of the transactions authorized using the authorization device.

In another embodiment, the present invention is able to keep track of which transactions have been authorized. In this case, if the same transaction is submitted again, the authorizing party can be notified. The authorizing party can be informed of when the transaction was authorized, as well as, who and where the transaction originated from. In another embodiment, the present invention can also indicate attempted fraud by indicating how many times a transaction has been submitted for authorization.

Using the system software, a user can also review the information stored in memory. By accessing this information, the person responsible for the fraudulent authorization can be determined and possibly be held liable for his or her actions.

Although the apparatus of the present invention has been described in detail for purpose of illustration, it is understood that such detail is solely for that purpose, and variations can be made therein by those skilled in the art without departing from the scope of the invention. The apparatus of the present invention is defined by the following claims.

I claim:

1. An authorization system using an authorizing device which allows an authorizing party to authorize only one transaction at a time comprising:

a system processing module comprising system software;
  an authorizing device in communication with the system processing module via a connector, wherein the authorizing device comprises:
    authorization software; and
    an authorizing device processing module comprising volatile memory and an indicator, wherein the instructions of the authorization software instructs the authorizing device processing module to set the indicator when an authorizing party authorizes a transaction and to prevent the authorization of a transaction if the indicator is set.

2. The system of claim 1, wherein the system software further comprises instructions for saving at least a part of an authorized transaction.

3. The system of claim 2, wherein the authorization system further comprises system memory for saving at least a part of an authorized transaction in the system memory in response to instructions from the system software.

4. The system of claim 3, wherein the system software further comprises instructions for allowing a user to review the information stored in the system memory.

5. The system of claim 2, where the authorizing device further comprises authorizing device non-volatile memory for saving at least a part of an authorized transaction in response to instructions from the system software.

6. The system of claim 5, wherein the system software further comprises instructions for allowing a user to review information stored in the authorizing device non-volatile memory.

7. The system of claim 2, wherein the system software further comprises instructions for saving the top half of the first page of an authorized transaction.

8. The system of claim 2, wherein the system software comprises instructions for saving key aspects of an authorized transaction.

9. The system of claim 8, wherein the key aspects of the authorized transaction further comprise who originated the transaction, when the transaction was authorized and where the authorized transaction was sent.

10. The system of claim 2, wherein the system software further comprises instructions for keeping track of authorized transactions and for informing the authorizing party if a previously authorized transaction is being submitted again.

11. The system of claim 2, wherein the system software further comprises instructions for keeping track of the number of times a transaction has been submitted and informs the authorizing party.

12. The system of claim 2, wherein the information to be stored is limited to the information relating to the last transaction.

13. The system of claim 2, wherein the information to be stored ranges from about the last transaction to the first transaction.

14. The system of claim 2, wherein the information to be stored is limited to information relating to the last transaction.

15. The system of claim 2, wherein the information to be stored ranges from about the last transaction to the first transaction.

16. The system of claim 2, wherein the authorization system further comprises system memory for saving at least a part of an authorized transaction in the system memory in response to instructions from the authorization software.

17. The system of claim 2, where the authorizing device further comprises authorizing device non-volatile memory for saving at least a part of an authorized transaction in response to instructions from the authorization software.

18. The system of claim 2, wherein the authorizing device software further comprises instructions for saving the top half of the first page of an authorized transaction.

19. The system of claim 2, wherein the authorization software comprises instructions for saving key aspects of an authorized transaction.

20. The system of claim 19, wherein the key aspects of the authorized transaction further comprise who originated the transaction, when the transaction was authorized and where the authorized transaction was sent.

21. The system of claim 2, wherein the authorization software further comprises instructions for keeping track of authorized transactions and for informing the authorizing party if a previously authorized transaction is being submitted again.

22. The system of claim 2, wherein the authorization software further comprises instructions for tracking the number of times a transaction has been submitted and for informing the authorizing party.

23. The system of claim 1, wherein the system processing module is a computer.

24. The system of claim 1, wherein the authorizing software further comprises instructions for saving at least a part of an authorized transaction.

25. The system of claim 1, wherein the indicator is at least one bit stored in the volatile memory.

26. The system of claim 1, wherein the indicator is reset when power to the authorizing device is disconnected.

27. The system of claim 1, wherein the authorizing device further comprises a mechanical switch for resetting the indicator.

28. The system of claim 1, wherein the authorizing device further comprises an electronic switch for resetting the indicator.

29. The system of claim 1, wherein the authorizing device is selected from the group consisting of palmtops, personal digital assistants (PDAs), computers, laptop computers, smart card systems, and similar authorizing devices having a processing module.

30. The system of claim 1, wherein the connector is a wireless connection.

31. The system of claim 30, wherein the wireless connection is an infrared system.

32. The system of claim 30, wherein the wireless connection is an RF system.

33. An authorization system using an authorizing device which allows an authorizing party to authorize only one transaction at a time comprising:
   a system processing module comprising system software;
   an authorizing device in communication with the system processing module via a connector, wherein the authorizing device comprises:
      authorization software;
      an authorizing device processing module comprising volatile memory and an indicator; and
      a mechanical switch, wherein the authorization software instructs the authorizing device processing module to set the indicator when an authorizing party authorizes a transaction and a physical action is required to reset the indicator.

34. An authorization system using a smart card which allows an authorizing party to authorize only one transaction at a time comprising:
   a system processing module comprising system software, the system software comprising instructions;
   a smart card reader connected to the system processing module via a connector; and
   a smart card in communication with the smart card reader, the smart card comprising smart card software comprising instructions; and
   a smart card processing module comprising volatile memory and an indicator,
   wherein the instructions of the smart card software instruct the smart card processing module to set the indicator when an authorizing party authorizes a transaction and prevents the authorization of a transaction if the indicator is set.

35. The system of claim 34, wherein the system software further comprises instructions for saving at least a part of an authorized transaction.

36. The system of claim 35, wherein the authorization system further comprises system memory for saving at least a part of an authorized transaction in the system memory in response to instructions from the system software.

37. The system of claim 36, wherein the system software further comprises instructions for allowing a user to review the information stored in the system memory.

38. The system of claim 35, where the smart card further comprises smart card non-volatile memory for saving at least a part of an authorized transaction in the smart card memory in response to instructions from the system software.

39. The system of claim 38, wherein the system software further comprises instructions for allowing a user to review information stored in the smart card non-volatile memory.

40. The system of claim 35, wherein the system software further comprises instructions for saving the top half of the first page of an authorized transaction.

41. The system of claim 35, wherein the system software comprises instructions for saving key aspects of an authorized transaction.

42. The system of claim 41, wherein the key aspects of the authorized transaction further comprise who originated the transaction, when the transaction was authorized and where the authorized transaction was sent.

43. The system of claim 35, wherein the system software further comprises instructions for keeping track of authorized transactions and for informing the authorizing party if a previously authorized transaction is being submitted again.

44. The system of claim 35, wherein the system software further comprises instructions for keeping track of the number of times a transaction has been submitted and for informing the authorizing party.

45. The system of claim 35, wherein the information to be stored is limited to the information relating to the last transaction.

46. The system of claim 35, wherein the information to be stored ranges from about the last transaction to the first transaction.

47. The system of claim 35, wherein the smart card further comprises a mechanical switch to reset the indicator.

48. The system of claim 47, wherein the mechanical switch is located on the smart card to enable a user to access the mechanical switch when the smart card is in the smart card reader.

49. The system of claim 35, wherein the authorization system further comprises system memory for saving at least a part of an authorized transaction in the system memory in response to instructions from the smart card software.

50. The system of claim 35, where the smart card further comprises non-volatile smart card memory for saving at least a part of an authorized transaction in the smart card memory in response to instructions from the smart card software.

51. The system of claim 35, wherein the smart card software further comprises instructions for saving the top half of the first page of an authorized transaction.

52. The system of claim 35, wherein the smart card software comprises instructions for saving key aspects of an authorized transaction.

53. The system of claim 52, wherein the key aspects of the authorized transaction further comprise who originated the transaction, when the transaction was authorized and where the authorized transaction was sent.

54. The system of claim 35, wherein the smart card software further comprises instructions for keeping track of authorized transactions and for informing the authorizing party if a previously authorized transaction is being submitted again.

55. The system of claim 35, wherein the smart card software further comprises instructions for keeping track of the number of times a transaction has been submitted and informs the authorizing party.

56. The system of claim 35, wherein the information to be stored is limited to the information relating to the last transaction.

57. The system of claim 35, wherein the information to be stored ranges from about the last transaction to the first transaction.

58. The system of claim 34, wherein the indicator is at least one bit.

59. The system of claim 34, wherein the indicator is reset when power to the smart card is disconnected.

60. The system of claim 34, wherein the smart card reader further comprises a mechanical switch to reset the indicator.

61. The system of claim 34, wherein the system processing module is a computer.

62. The system of claim 34, wherein the smart card software further comprises instructions for saving at least a part of an authorized transaction.

63. The system of claim 34, wherein the smart card further comprises an electronic switch for resetting the indicator.

64. The system of claim 34, wherein the smart card reader further comprises an electronic switch to reset the indicator.

65. The system of claim 34, wherein the connector is a wireless connection.

66. The system of claim 65, wherein the wireless connection is an infrared system.

67. The system of claim 65, wherein the wireless connection is an RF system.

68. An authorization system using a smart card which allows an authorizing party to authorize only one transaction at a time comprising:
   a system processing module comprising system software;
   a smart card reader connected to the system processing module; and
   a smart card in communication with the smart card reader, the smart card comprising smart card software comprising instructions;
   a smart card processing module comprising volatile memory and an indicator; and
   a mechanical switch, wherein the instructions of the smart card software instruct the smart card processing module to set the indicator when an authorizing party authorizes a transaction and a physical action is required to reset the indicator.

69. An authorization system using an authorizing device which allows an authorizing party to authorize a limited number of transactions at a time comprising:
   a system processing module comprising system software;
   an authorizing device in communication with the system processing module via a connector, wherein the authorizing device comprises:
   authorization software; and
   an authorizing device processing module comprising authorizing device volatile memory, and an indicator, wherein the authorization software instructs the authorizing device processing module to set the indicator when an authorizing party authorizes a maximum number of transactions and to prevent the authorization of a transaction if the indicator is set.

70. The authorization system of claim 69, wherein the authorizing party sets the maximum number of transactions that the authorizing party can authorize.

* * * * *